US010791669B2

(12) United States Patent
Dretzka et al.

(10) Patent No.: US 10,791,669 B2
(45) Date of Patent: Oct. 6, 2020

(54) TURF VEHICLE HAVING ACCESSORY ATTACHMENT SYSTEM

(71) Applicant: THE TORO COMPANY, Bloomington, MN (US)

(72) Inventors: Philip C. Dretzka, Woodbury, MN (US); Jeffrey W. Stern, Savage, MN (US); Steven R. Porter, Eagan, MN (US); C. Mark Atterbury, Lincoln, NE (US); Kenneth L. McConnell, Stevensville, MI (US); Curtis E. Wersal, Bloomington, MN (US)

(73) Assignee: THE TORO COMPANY, Bloomington, MN (US)

( * ) Notice: Subject to any disclaimer, the term of this patent is extended or adjusted under 35 U.S.C. 154(b) by 138 days.

(21) Appl. No.: 15/994,045

(22) Filed: May 31, 2018

(65) Prior Publication Data

US 2019/0008090 A1    Jan. 10, 2019

Related U.S. Application Data

(60) Provisional application No. 62/529,529, filed on Jul. 7, 2017.

(51) Int. Cl.
*A01D 34/00* (2006.01)
*A01D 34/64* (2006.01)
(Continued)

(52) U.S. Cl.
CPC ........... *A01D 34/001* (2013.01); *A01D 34/64* (2013.01); *A01D 34/82* (2013.01); *A01D 75/008* (2013.01);
(Continued)

(58) Field of Classification Search
CPC .... A01D 34/001; A01D 75/008; A01D 34/82; A01D 34/64; A01D 34/66; A01D 34/84;
(Continued)

(56) References Cited

U.S. PATENT DOCUMENTS 5,303,532 A * 4/1994 Phillips ................ A01D 34/863
56/12.7
5,561,969 A * 10/1996 Sandy .................. A01D 34/001
56/12.7
(Continued)

OTHER PUBLICATIONS

U.S. Appl. No. 62/529,529, filed Jul. 7, 2017, Dretzka et al.
(Continued)

*Primary Examiner* — Arpad Fabian-Kovacs
(74) *Attorney, Agent, or Firm* — Mueting Raasch Group (57) ABSTRACT

Accessory attachments systems for use with turf vehicles are described and illustrated. Such systems permit outdoor maintenance tools to be secured and transported by the vehicle, e.g., in locations conveniently accessible by an operator of the vehicle without leaving the operator platform (e.g., seat), and removed from the vehicle when desired. In some embodiments, the system includes one or more connectors each having: a mounting portion adapted to be removably secured to a panel attached to the vehicle; and a tool holding portion adapted to receive and hold an outdoor maintenance tool. The mounting portion of each connector may attach to any one of a plurality of receivers formed on panels secured to various locations on the vehicle.

19 Claims, 10 Drawing Sheets

(51) Int. Cl.
 B60R 11/06 (2006.01)
 A01D 34/82 (2006.01)
 A01D 75/00 (2006.01)
 B60R 11/00 (2006.01)
 A01D 34/66 (2006.01)
(52) U.S. Cl.
 CPC .............. *B60R 11/06* (2013.01); *A01D 34/66* (2013.01); *B60R 2011/004* (2013.01); *B60R 2011/0052* (2013.01); *B60R 2011/0071* (2013.01)
(58) Field of Classification Search
 CPC .................. A01D 34/866; B60R 11/06; B60R 2011/0052; B60R 2011/004; B60R 2011/0071; Y10S 56/09; B25B 5/006
 See application file for complete search history.

(56) References Cited

U.S. PATENT DOCUMENTS

| | | | | |
|---|---|---|---|---|
| 5,694,752 | A * | 12/1997 | Warfield, III | A01B 59/046 56/12.1 |
| 5,802,824 | A * | 9/1998 | Aldrich | A01D 34/001 56/12.7 |
| 5,992,811 | A | 11/1999 | McFerren et al. | |
| 6,409,029 | B1 * | 6/2002 | Bermes | A01D 75/004 211/207 |
| 6,494,445 | B1 * | 12/2002 | Bellis, Jr. | B25B 5/006 269/4 |
| D492,701 | S * | 7/2004 | DeShong | D15/17 |
| D493,180 | S * | 7/2004 | Crawford | D15/28 |
| 6,986,238 | B1 * | 1/2006 | Bloodworth | A01D 34/82 56/12.7 |
| 7,028,455 | B1 * | 4/2006 | Liguras | A01D 34/001 56/13.6 |
| 7,240,891 | B2 * | 7/2007 | Hafendorfer | F16M 13/02 248/676 |
| 7,398,637 | B1 * | 7/2008 | Sevey | A01D 34/84 56/12.7 |
| 7,644,565 | B2 * | 1/2010 | Uihlein | A01D 34/84 56/12.7 |
| 7,712,293 | B1 * | 5/2010 | Recker | A01D 75/008 56/12.7 |
| D616,904 | S * | 6/2010 | Armstrong | D15/17 |
| D661,320 | S * | 6/2012 | Armstrong | D15/17 |
| 8,387,205 | B2 * | 3/2013 | Weihl | A01D 42/06 15/347 |
| 8,616,505 | B2 | 12/2013 | Gates et al. | |
| D868,843 | S * | 12/2019 | Descoteaux | D15/17 |
| 2004/0182899 | A1 | 3/2004 | Deutchman | |
| 2006/0021314 | A1 * | 2/2006 | Hatfield | A01D 34/001 56/12.7 |
| 2006/0207235 | A1 * | 9/2006 | Izatt | A01D 34/4168 56/13.7 |
| 2014/0157744 | A1 | 6/2014 | Anderson | |
| 2015/0101302 | A1 | 4/2015 | Cooper | |
| 2018/0345876 | A1 * | 12/2018 | Lawrence | B60R 11/06 |
| 2019/0199120 | A1 * | 6/2019 | Hoppel | H02J 7/14 |

OTHER PUBLICATIONS

Arens, "New Product Test—The Seizmik Rac System," http://atvillustrated.com/content/new-product-test-seizmik-rac-system, retrieved on Jun. 6, 2019; 3 pages.

IDS NPL Document 1, "Komodo ATV ATVBCC ATV Bucket and Crate Carrier" Photographs. Komodo ATV & UTV Accessories, Baldwin Park, CA, USA. Available at least as early as Dec. 31, 2016; 1 page.

IDS NPL Document 2, "John Deere Bucket Holders" Single Bucket Model Nos. LPJD100 and LPJD301, Photographs. Deere & Company, Moline, IL, USA. Available at least as early as Dec. 4, 2015; 2 pages.

IDS NPL Document 3, "Fabworks Bucketholder" Model Nos. BH02 and BH01, Photographs. Fabworks OEM, Athens, TN, USA. Available at least as early as 2015; 3 pages.

IDS NPL Document 4, "Wright Bucket Holder" Unknown Model Number, Photographs. Wright Manufacturing Inc., Fredericksburg, MD, USA. Available at least as early as 2015; 1 page.

IDS NPL Document 5, "Stearns Mad Dog ATV EZ3 Bucket Holder" Manufacturing No. A743BLK-00-000, Photographs. Manufacturer Unknown. Available at least as early as 2015; 1 page.

IDS NPL Document 6, "Bucket Binder UTV Bucket Holder" Model No. UBB1, Photographs. All Rite Products, Inc., West Jordan, UT, USA. Available at least as early as 2015; 1 page.

IDS NPL Document 7, "Fabworks Blower Holder" Unknown Model Numbers, Photographs. Fabworks OEM, Athens, TN, USA. Available at least as early as 2015; 1 page.

IDS NPL Document 8, "Fabworks Blower Holder" Model No. BNG1, Photographs. Fabworks OEM, Athens, TN, USA. Available at least as early as 2015; 2 pages.

IDS NPL Document 9, "Fabworks Blower Holder" Unknown Model Number, Photographs. Fabworks OEM, Athens, TN, USA. Available at least as early as 2015; 1 page.

IDS NPL Document 10, "Fabworks Trailer Trimmer Holder" Unknown Model Number, Photographs. Fabworks OEM, Athens, TN, USA. Available at least as early as 2015; 1 page.

IDS NPL Document 11, "Fabworks Fuel Tank Holder" Part No. 5.0GC, Photograph. Fabworks OEM, Athens, TN, USA. Available at least as early as 2015; 1 page.

IDS NPL Document 12, "Fabworks Trailer Blower Holder" Unknown Part Number, Photographs. Fabworks OEM, Athens, TN, USA. Available at least as early as 2015; 1 page.

IDS NPL Document 13, "Jungle Jim's Trailer Trimmer Racks" Model No. 2TR, Photograph. Jungle Jim's Accessory Products, Louisville, KY, USA. Available at least as early as 2015; 1 page.

IDS NPL Document 14, "Jungle Jim's Trailer Trimmer Racks" Unknown Model Number, Photographs. Jungle Jim's Accessory Products, Louisville, KY, USA. Available at least as early as 2015; 1 page.

IDS NPL Document 15, "Jungle Jim's Mower Trimmer Holder" Unknown Model Number, Photograph. Jungle Jim's Accessory Products, Louisville, KY, USA. Available at least as early as 2015; 1 page.

IDS NPL Document 16, "Jungle Jim's Trailer Blower Holders" Model No. 2BH, 1BH, and Unknown Model Number, Photographs. Jungle Jim's Accessory Products, Louisville, KY, USA. Available at least as early as 2015; 2 pages.

IDS NPL Document 17, "Jungle Jim's Bucket/Cooler Holder" Model Cooler, Photograph. Jungle Jim's Accessory Products, Louisville, KY, USA. Available at least as early as 2015; 1 page.

IDS NPL Document 18, "Jungle Jim's Trainer Tool Rack" Model TR-TOOL, Photograph. Jungle Jim's Accessory Products, Louisville, KY, USA. Available at least as early as 2015; 1 page.

IDS NPL Document 19, "Power Design ROPS Rack" Unknown Model Number, Photographs. Power Design, Iowa City, IA, USA. Available at least as early as 2015; 2 pages.

IDS NPL Document 20, "Trimmer Mount" Model Pack 'Em Brand and Unknown Model Number, Photographs. Rack' em Mfg LLC, Iowa City, IA, USA. Available at least as early as 2015; 2 pages.

IDS NPL Document 21, "RC-Rubber Clamps" Unknown Model Number, Photographs. TrimmerTrap Inc., Louisville, KY, USA. Available at least as early as 2015; 1 page.

IDS NPL Document 22, "Trailer Trimmer Holders" Unknown Model Number, Photographs. TrimmerTrap Inc., Louisville, KY, USA. Available at least as early as 2015; 3 pages.

IDS NPL Document 23, "Trailer Blower Holders"/"Trailer Tank Holders" Unknown Model Numbers and Model believed to be ST-2, Photographs. TrimmerTrap Inc., Louisville, KY, USA. Available at least as early as 2015; 4 pages.

IDS NPL Document 24, "Trailer/Wall Cooler Holders" Models WC-1, Photographs. TrimmerTrap Inc., Louisville, KY, USA. Available at least as early as 2015; 1 page.

IDS NPL Document 25, "Trailer Fuel Tank Holders" Unknown Model Numbers, Photograph. TrimmerTrap Inc., Louisville, KY, USA. Available at least as early as 2015; 1 page.

(56) References Cited

OTHER PUBLICATIONS

IDS NPL Document 26, "Wall Blower Holders" Unknown Model Numbers, Photographs. TrimmerTrap Inc., Louisville, KY, USA. Available at least as early as 2015; 1 page.

IDS NPL Document 27, "Miscellaneous Clamps" Unknown Model Numbers, Photographs. Manufacturer Unknown. Available at least as early as 2015; 5 pages.

\* cited by examiner

TURF VEHICLE HAVING ACCESSORY ATTACHMENT SYSTEM

This application claims the benefit of U.S. Provisional Application No. 62/529,529, filed Jul. 7, 2017, which is incorporated herein by reference in its entirety.

Embodiments of the present disclosure are directed to turf vehicles such as riding lawn mowers and, more particularly, to accessory attachment systems for use with the same.

BACKGROUND

Homeowners and professionals alike typically require multiple tools to maintain turf areas. For example, riding lawn mowers are often used to maintain lawn surfaces. When mowing is complete, the operator generally uses other, secondary tools to reach areas not accessible by the mower, or to perform non-mowing tasks. For instance, handheld trimmers and edgers are often used to maintain intricate lawn borders not satisfactorily accessed or maintained by the lawn mower. Moreover, debris blowers and vacuums may be used to clear debris from turf or surrounding landscape/hardscape surfaces upon completion of mowing.

Unfortunately, the operator must typically return to a tool storage location (e.g., garage or trailer) to retrieve the desired secondary tool. When multiple tools are to be utilized, repeatedly accessing these tools may become time consuming, especially for professional contractors who may service several lawns in a given day, and/or when the storage location is located a distance away.

SUMMARY

Embodiments of the present disclosure are directed to accessory attachments systems that may address these and other issues. While described herein in the context of particular embodiments, it is to be understood that the embodiments described are exemplary only and other configurations are certainly contemplated. Moreover, while described herein primarily in the context of a ride-on mower, other ride-on and walk-behind turf vehicles may also benefit from attachment systems in accordance with embodiments of the present disclosure.

In one embodiment, a turf vehicle is provided that includes: a chassis having front and rear sides and left and right sides; a tool mounting panel located on each of two sides of the chassis, wherein each tool mounting panel defines a plurality of receivers; and first and second tool connectors. Each tool connector includes: a mounting portion adapted to be removably secured to the panels at two or more alternative locations via one or more of the plurality of receivers; and a tool holding portion adapted to receive and hold an outdoor maintenance tool. The tool holding portion of the first tool connector is adapted to receive and support a first outdoor maintenance tool, and the tool holding portion of the second tool connector is adapted to receive and hold a second outdoor maintenance tool different than the first outdoor maintenance tool.

In another embodiment, a riding turf vehicle is provided that includes: a chassis comprising front and rear sides and left and right sides; wheels rotatably coupled to the chassis and adapted to support the chassis relative to a ground surface; a prime mover attached to the chassis and adapted to provide driving power to one or more of the wheels and to a ground working tool supported by the chassis; and a tool mounting panel located on each of two sides of the chassis, wherein each tool mounting panel defines a plurality of receivers. Also provided are removable first and second tool connectors that each include: a mounting portion adapted to be secured relative to any one of the panels via coupling with one or more of the plurality of receivers; and a tool holding portion adapted to receive and carry an outdoor maintenance tool. The tool holding portion of the first tool connector is adapted to receive and carry a first outdoor maintenance tool, and the tool holding portion of the second tool connector is adapted to simultaneously receive and hold a second outdoor maintenance tool different than the first outdoor maintenance tool.

In yet another embodiment, a method for supporting an outdoor maintenance tool relative to a chassis of a turf vehicle is provided. The method includes attaching a first tool connector to a tool panel assembly located on the chassis, wherein the first tool connector includes: a mounting portion adapted to secure to any one of a plurality of predefined locations on the panel assembly; and a tool holding portion adapted to receive and hold a first tool. The method further includes attaching a second tool connector to the panel assembly, the second tool connector including: a mounting portion adapted to secure to one of the plurality of predefined locations on the panel assembly; and a tool holding portion adapted to receive and hold a second tool that is different than the first tool. The method also includes: attaching the first tool to the tool holding portion of the first tool connector; and attaching the second tool to the tool holding portion of the second tool connector while the first tool is held by the first tool connector.

In still another embodiment, a turf vehicle is provided that includes: a chassis having front and rear sides and left and right sides; a rear wheel and a front wheel supporting the chassis upon a ground surface; and a tool mounting panel located on at least one of the left and right sides of the chassis and at a location forward of the rear wheel, wherein the tool mounting panel defines a plurality of receivers. A bucket connector is also provided and includes: a mounting portion adapted to be removably secured to the panel; and a bucket holding portion adapted to receive and hold a bucket at a longitudinal location between the front and rear wheel.

In yet another embodiment, a turf vehicle is provided that includes: a chassis comprising front and rear sides and left and right sides; a rear wheel and a front wheel supporting the chassis upon a ground surface; an operator platform supported by the chassis; and a tool mounting panel located on at least one of the left and right sides of the chassis, wherein the tool mounting panel defines a plurality of receivers. A bucket connector is also provided and includes: a mounting portion adapted to be removably secured to the panel; and a bucket holding portion adapted to receive and hold a bucket at a location lateral to the operator platform.

A more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, the terms "Figure x" and "FIG. x" may be used interchangeably herein.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

Figure 1:
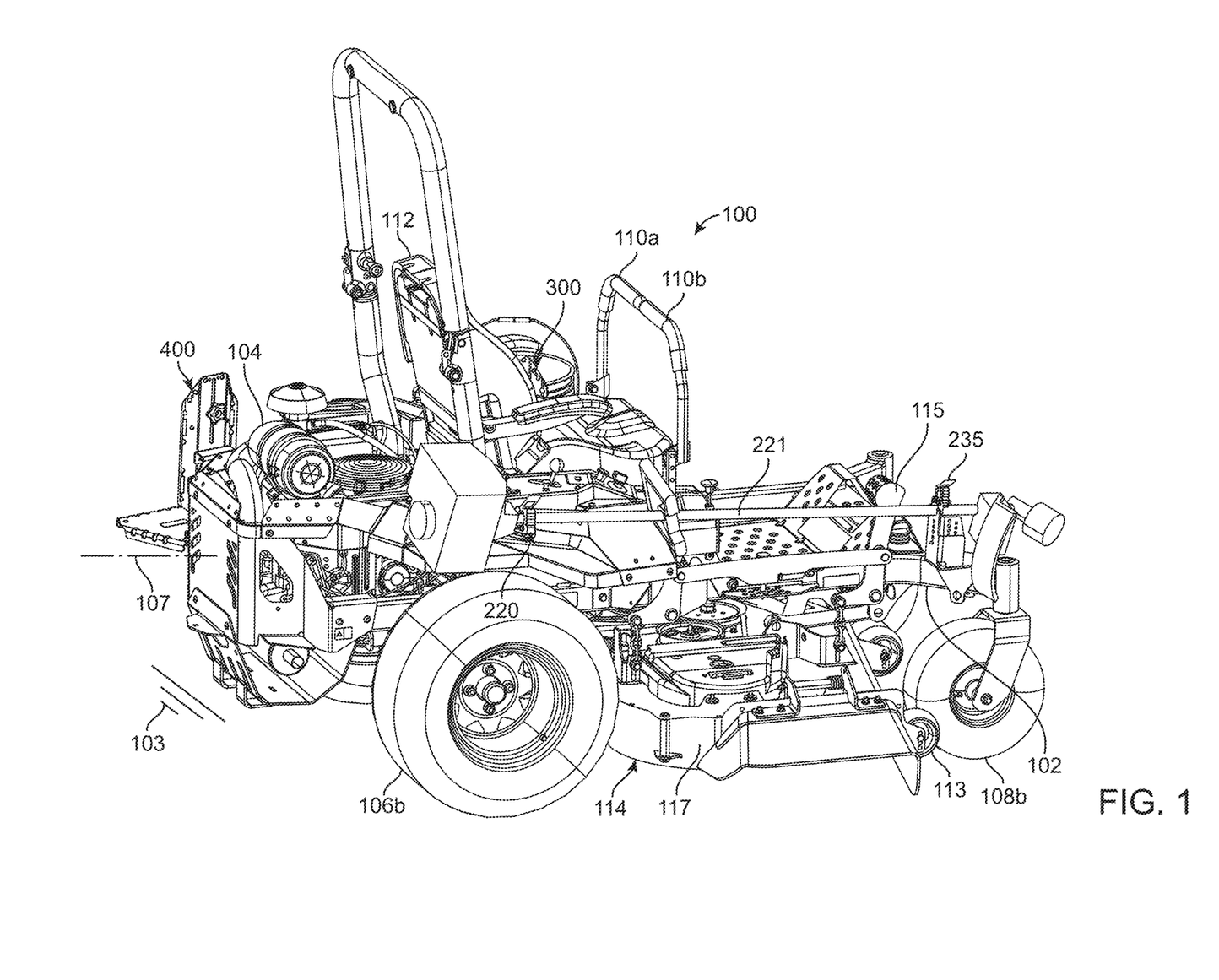
FIG. 1 is a right-side rear perspective view of a turf vehicle, e.g., riding lawn mower, incorporating an accessory attachment system in accordance with embodiments of the present disclosure.

It is noted that the term "comprises" (and variations thereof) does not have a limiting meaning where this term appears in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower is in an operating configuration, e.g., while the mower 100 is positioned such that wheels 106 and 108 rest upon a generally horizontal ground surface 103 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

Embodiments described and illustrated herein are directed to an accessory attachment system and a turf vehicle incorporating the same. Such exemplary attachment systems may provide a tool panel assembly that includes one or more tool mounting panels secured to the vehicle (e.g., to a first (left), second (right), and/or third (rear) side of the vehicle). Each panel includes receivers (which may, in one embodiment, be apertures) that are adapted to receive, or otherwise engage with, any of a plurality of tool connectors. For example, an exemplary tool connector may include: a mounting portion adapted to be removably secured to the panel via engagement with one or more of the receivers; and a tool holding portion adapted to receive and hold the tool. Each tool connector may be designed to accommodate a particular tool, or may form a generic platform for receiving and carrying a generic or nonspecific tool.

In some embodiments, exemplary attachment systems may include different connectors that may be simultaneously attached to different locations on the tool panel assembly. For instance, the tool panel assembly may include tool mounting panels on two or more (e.g., left, right, and/or rear) sides of the vehicle. A first tool connector may be secured at any one of two or more locations on the tool panel assembly, while a second tool connector may be secured, alternatively or simultaneously, to another location. As a result, one, two, or even more outdoor maintenance tools (e.g., string trimmer, edger, receptacle (bucket), shovel, debris grabbing device, rake, debris blower, etc.) may be carried (e.g., simultaneously) by the turf vehicle during vehicle operation, and optionally stored thereon when the vehicle is not in use. When the secondary tool is needed, it is easily accessible by the riding operator, in some instances without even exiting the operator platform (e.g., seat). For example, the tool may be stored at a location on the vehicle that the operator may easily access, e.g., from an operator seat.

In some embodiments, each tool mounting panel (also referred to herein as "tool panel") may include a plurality of receivers separated by a predetermined spacing. As a result, each tool connector may be moved between various locations to accommodate particular operator preferences. Moreover, the tool may be entirely supported by the tool panel assembly, or alternatively, partially supported by supplemental tool connectors attached to other locations on the vehicle.

Figure 2:
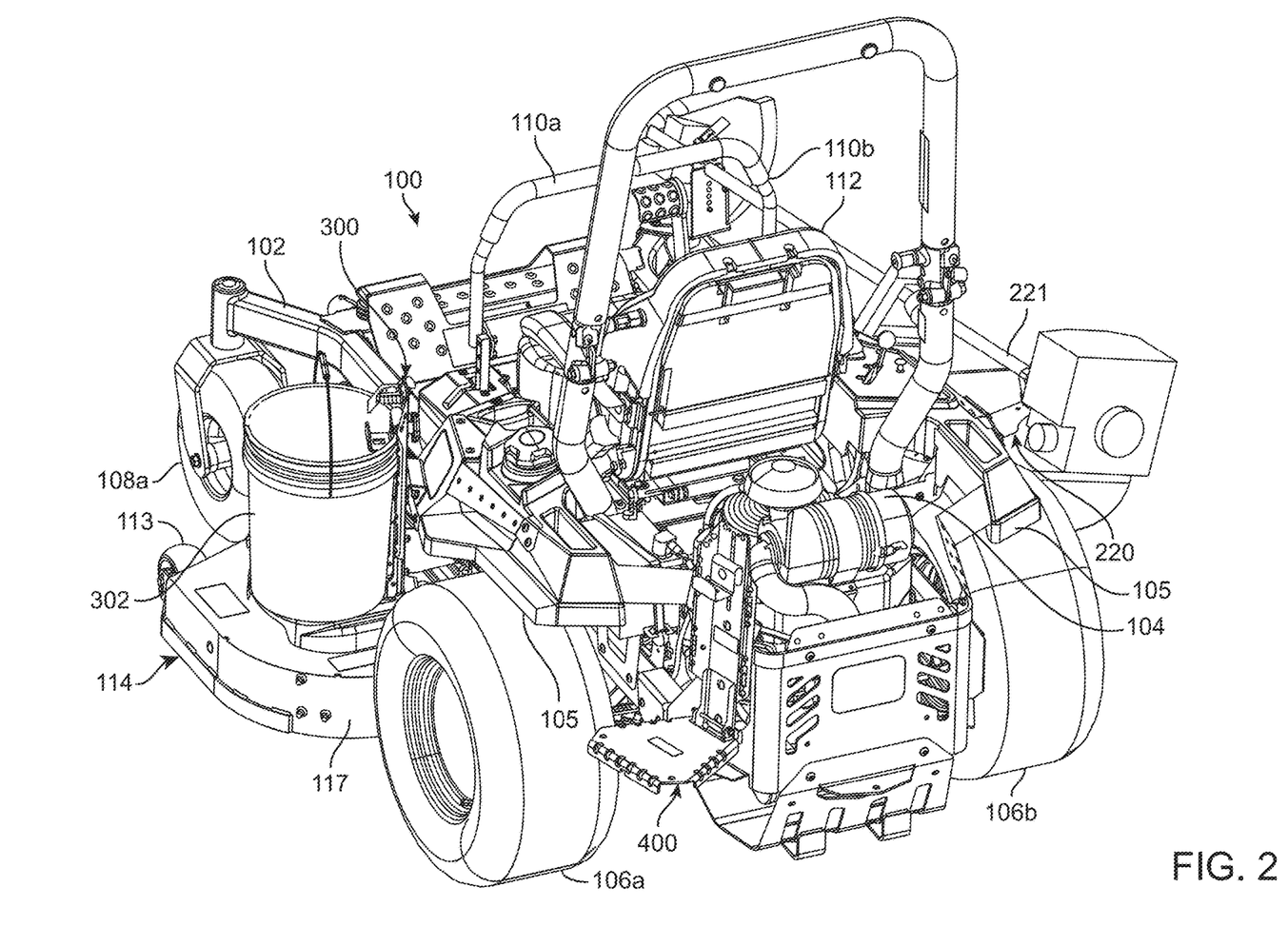
FIG. 2 is a left-side rear perspective view of the turf vehicle of FIG. 1.

With this brief introduction, reference is now made to the figures of the drawing, wherein like reference numerals designate like parts and assemblies throughout the several views. FIGS. 1 and 2 illustrate a turf vehicle 100 in accordance with embodiments of the present disclosure. As used herein, a "turf vehicle" may include most any self-propelled vehicle adapted to provide a maintenance function to a turf or other surface. While shown as a riding, self-propelled, turf vehicle, e.g., a zero-radius-turning (ZRT) riding lawn mower 100 (also referred to herein simply as a "vehicle" or "mower"), such a configuration is not limiting. That is, while embodiments are described herein with respect to a riding mower, those of skill in the art will realize that embodiments of the present disclosure are equally applicable to other types of walk-behind or riding (e.g., stand-on) turf care products (e.g., aerators, spreader/sprayers, dethatchers, debris management systems (e.g., blowers, vacuums, sweeper, etc.), roto-tillers, and the like).

As shown in FIGS. 1 and 2, the mower 100 may include a chassis or frame 102 supporting a prime mover, e.g., electric motor or internal combustion engine 104. Left and right ground engaging drive members (e.g., wheels 106a, 106b) may be rotatably coupled to left and right sides, respectively, of a rear portion of the chassis 102/mower 100. The drive wheels 106 may be independently powered by the engine (e.g., via one or more hydraulic motors, transaxles, transmissions, or the equivalent) so that the drive wheels 106 may support the chassis 102/mower 100 relative to, and selectively propel the mower over, the ground surface 103 during operation.

One or more controls, e.g., left and right drive control levers 110 (e.g., 110a, 110b) may also be provided. The drive control levers 110 are generally pivotally coupled to the mower such that they may pivot forwardly and rearwardly (e.g., about an axis transverse to a longitudinal axis 107 of the mower) under the control of an operator located upon an operator platform, e.g., sitting in an operator seat 112. The drive control levers 110 are operable to independently control speed and direction of their respective drive wheels 106 via manipulation of the mower's drive system as is known in the art. While illustrated herein as incorporating separate drive control levers 110, other controls, e.g., single or multiple joysticks or joystick-type levers, steering wheels, etc. may also be used without departing from the scope of the disclosure. The mower 100 may further include various other mower controls (power take-off engagement, ignition, throttle, etc.), as is known in the art.

The illustrative mower 100 may also include a pair of front swiveling caster wheels 108 (108a, 108b) that support a front portion of the mower 100 in rolling engagement with the ground surface 103 during operation. Of course, other drive configurations (e.g., actively steered front and/or rear wheels, tri-wheel configurations, front drive wheels, etc.) and vehicles using drive members other than wheels (e.g., tracks), are certainly contemplated within the scope of this disclosure.

A ground working tool such as a lawn mower cutting deck 114 may be mounted to the lower side of the chassis 102, e.g., generally between the drive wheels 106 and the caster wheels 108. The cutting deck 114 may include a deck housing 117 that partially defines an enclosed cutting chamber. The cutting chamber may partially surround one or more rotatable cutting blades (not shown) each attached to a rotatable blade spindle assembly of the deck. In other embodiments, reel-type cutting elements may be employed. Moreover, while illustrated as a belly-mount deck, other mower configurations may, alternatively or in addition, utilize an out-front or rear-mounted (e.g., towed) deck.

During operation, power is selectively delivered by the engine 104 to the cutting deck 114 (e.g., to the spindle assemblies) and the drive wheels 106, whereby the cutting blades rotate at a speed sufficient to sever grass and other vegetation as the deck passes over the ground surface 103 (e.g., as the mower moves forwardly in a direction parallel to the longitudinal axis 107). Typically, the cutting deck 114 further has an operator-selectable height-of-cut control system 115 to allow deck height adjustment relative to the ground surface 103. The cutting deck 114 may optionally include anti-scalp rollers 113 to assist in reducing blade/ground contact.

Figure 3:
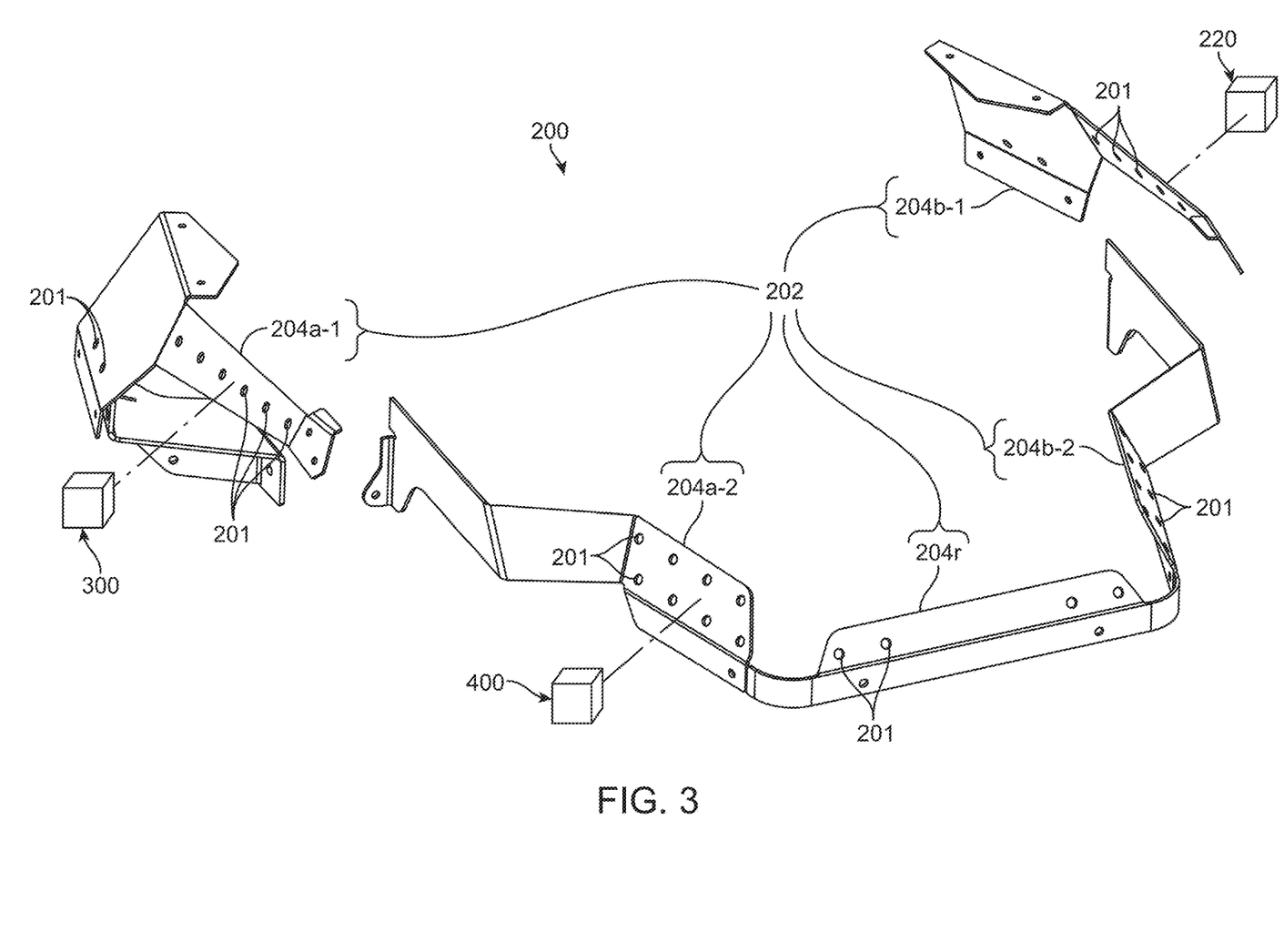
FIG. 3 is a left-side rear perspective view of a tool panel assembly of the attachment system of FIG. 1 in accordance with one embodiment of the disclosure, the panel assembly shown isolated from the vehicle.

With this general overview, an embodiment of an exemplary accessory attachment system 200 for use with the mower 100 will now be described, initially with reference to FIG. 3 (note that most mower structure is removed in FIGS. 3-10 to better illustrate aspects of the exemplary attachment systems). As shown in this figure, the attachment system may include a tool panel assembly 202 that includes one or more tool panels 204 on one or more sides of the chassis (e.g., left-side panels 204a-1 and 204a-2, right side panels 204b-1 and 204b-2, and rear panel 204r) as well as one or more tool connectors 220, 300, and 400. The tool panels may be adapted to attach to the chassis 102, either directly or indirectly (e.g., via plastic side pods 105 (see FIG. 2), which may be configured to provide the necessary structural support to the panels) such that an outdoor maintenance tool attached to the tool panels is adequately supported by the mower. While shown diagrammatically in FIG. 3, exemplary embodiments of the tool connectors 220, 300, and 400 are illustrated in detail in subsequent figures.

In the embodiments illustrated herein, each tool panel defines one or more apertures 201 that function as receivers for the tool connectors. By providing at least some of the apertures 201 in a predefined location or pattern, those tool connectors that simultaneously engage more than one aperture may be located at most any location on the tool panel assembly 202. For example, the apertures 201 may be equidistant from one another in a linear or nonlinear fashion, and/or may define an array of apertures (linear row(s) and/or column(s) (wherein at least one or more columns include two or more apertures), circular array, etc.). Accordingly, tool panel assemblies like those described herein provide a versatile attachment system that allows custom placement of outdoor maintenance tools to suite a wide variety of user preferences and tool locations. Moreover, as shown in FIG. 3, the upwardly incline of each panel (204a-1, 204a-2, 204b-1, 204b-2, and 204r) may be similar or identical to one another so that various tool connectors will interface in a similar manner regardless of which tool panel is used.

Figure 4:
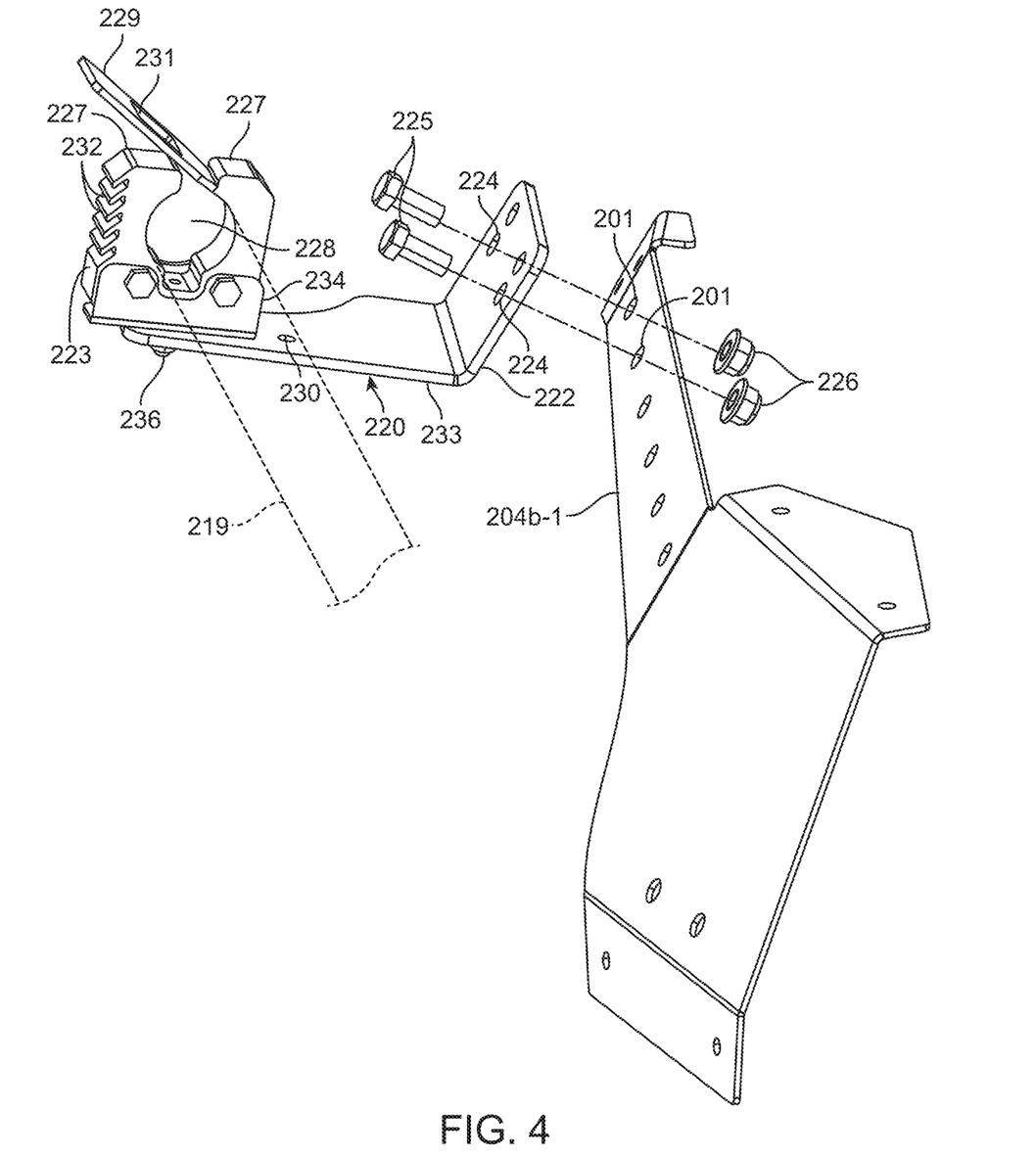
FIG. 4 is a perspective view of an exemplary first tool connector exploded from the tool panel assembly, the first tool connector adapted to hold an end of a first tool, e.g., an elongate string trimmer or other elongate tool.

FIG. 4 illustrates the tool connector 220 in accordance with one embodiment of the disclosure. As illustrated in FIGS. 1 and 2, the exemplary tool connector 220 may be configured to receive and carry a string trimmer 221 (trimmer not shown in FIG. 4) or other elongate tool 219 such as a rake, shovel, or debris grabbing device. As with the other tool connectors described herein, the connector 220 may include both a mounting portion 222 and a tool holding portion 223. The mounting portion may include a tab or flange defining one or more holes 224 that selectively align with corresponding apertures 201 on the tool panel assembly 202 (e.g., on the panel 204b-1). One or more fasteners (e.g., bolts 225) may then be passed through corresponding aligned holes 224/apertures 201 (on panel 204b-1) and threaded to associated nuts 226 to removably secure the tool connector 220 in place. Again, while shown as connected via two specific apertures 201, those of skill in the art will recognize that the connector 220 could be moved to another adjacent pair of apertures 201 (on the panel 204b-1 or any other panel 204) without departing from the scope of this disclosure.

The tool holding portion may receive and hold or carry an outdoor maintenance tool. Accordingly, the tool holding portion may be reconfigurable between: a release configuration, wherein the tool may be attached to or removed from the tool connector; and hold configuration, wherein the tool is immobilized relative to the tool connector.

The tool holding portion 223 may be formed by resilient (e.g., rubber) elements 227 between which the tool (string trimmer 221 or another elongate tool) shaft may be placed. The elements 227 may together define a passage 228 generally corresponding in size and shape to a corresponding portion (e.g., shaft) of the tool. The holding portion 223 may further include a latch 229 adapted to compress the resilient elements 227 about the shaft once the latter is inserted into the passage 228 (via an opening formed at the top of the resilient elements) to frictionally secure the tool relative thereto. In some embodiments, the latch may be adjustable to accommodate different tools (e.g., string trimmers) from the same or different manufacturer. For example, the latch 229 may form a tab attached to one of the resilient elements 227. The tab may include an engagement surface 231 that can be engaged with any one of several slots 232 formed in the other resilient element 227 as shown. For example, by engaging the surface 231 to one of the lower slots 232 in FIG. 4, the passage 228 may be reduced in size, while engaging the surface 231 with a higher slot 232 may accommodate a larger tool diameter.

In one embodiment, the mounting portion 222 is formed from a sheet metal bracket 233. An L-shaped bracket 234 may then be attached to the sheet metal bracket 233. In one embodiment, the bracket 234 includes a threaded stud (not shown) that may pass through a hole 230 in the bracket 233 and be secured relative thereto with a nut 236. The resilient elements 227 may be secured to the L-shaped bracket 234 using most any acceptable method (e.g., using fasteners (as shown) or adhesives). Of course, such a construction is exemplary only, as most any connector configuration that provides the desired mounting portion and tool holding portion is contemplated within the scope of this disclosure.

Figure 5:
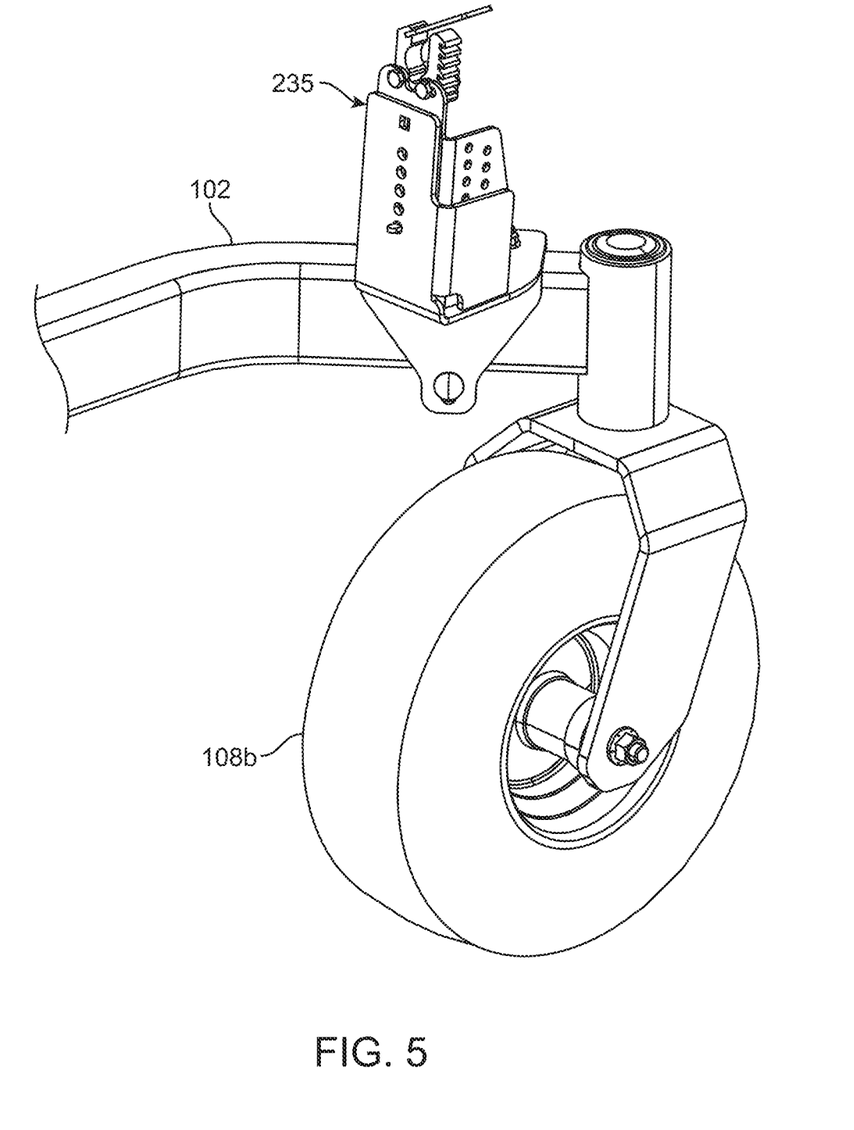
FIG. 5 is a perspective view of a supplemental connector for use with the first tool connector of FIG. 4, the supplemental connector adapted to support a second end of the first tool.

When the string trimmer (or other elongate tool) is long or otherwise too heavy to be adequately supported by a single tool connector 220, a supplemental tool connector 235 like that illustrated in FIGS. 1 and 5 may be provided. While the supplemental tool connector 235 could be coupled to one of the panels 204, it is in the illustrated embodiment independent in that it does not connect to or is not otherwise associated with the tool panel assembly 202. Rather, the tool connector 235 shown includes a tool holding portion similar to the holding portion 223 already described, but attaches directly to the chassis 102 or another portion of the vehicle 100 at a location spaced-apart from the mounting panels. In some embodiments, the connector 235 may provide some elevational adjustability to accommodate versatile attachment of different tools.

While different configurations are certainly possible, the string trimmer (or other elongate tool) may be supported by the attachment system such that it is generally parallel (when viewed from above) to the longitudinal axis 107 of the mower. Moreover, its longitudinal placement may be such that the string trimmer does not protrude past the front and rear ends of the mower 100.

Another tool connector 300 contemplated is a receptacle or "bucket" holder for holding a bucket 302 as shown in FIGS. 1, 6, 7, and 8. In the illustrated embodiments, the bucket holder tool connector 300 is intended to accommodate a standard cylindrical five-gallon bucket 302 as is commonly known in the art. However, those of skill in the art will realize that buckets of other sizes, and even other "non-bucket" receptacles, are certainly possible without departing from the scope of this disclosure.

Figure 6:
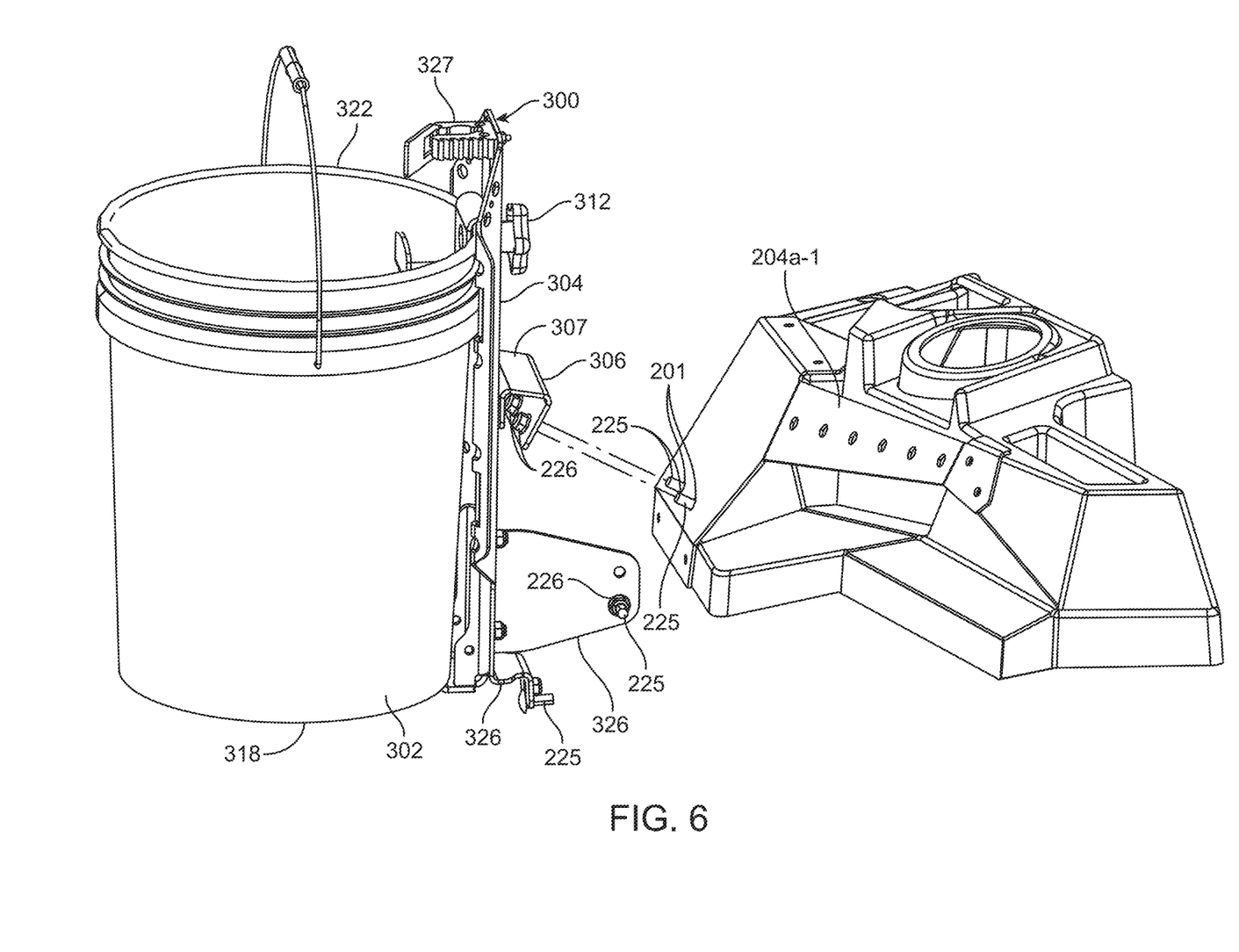
FIG. 6 illustrates an exemplary second tool, e.g., receptacle, and second tool ("bucket") connector, both shown exploded from the tool panel assembly.
Figure 7:
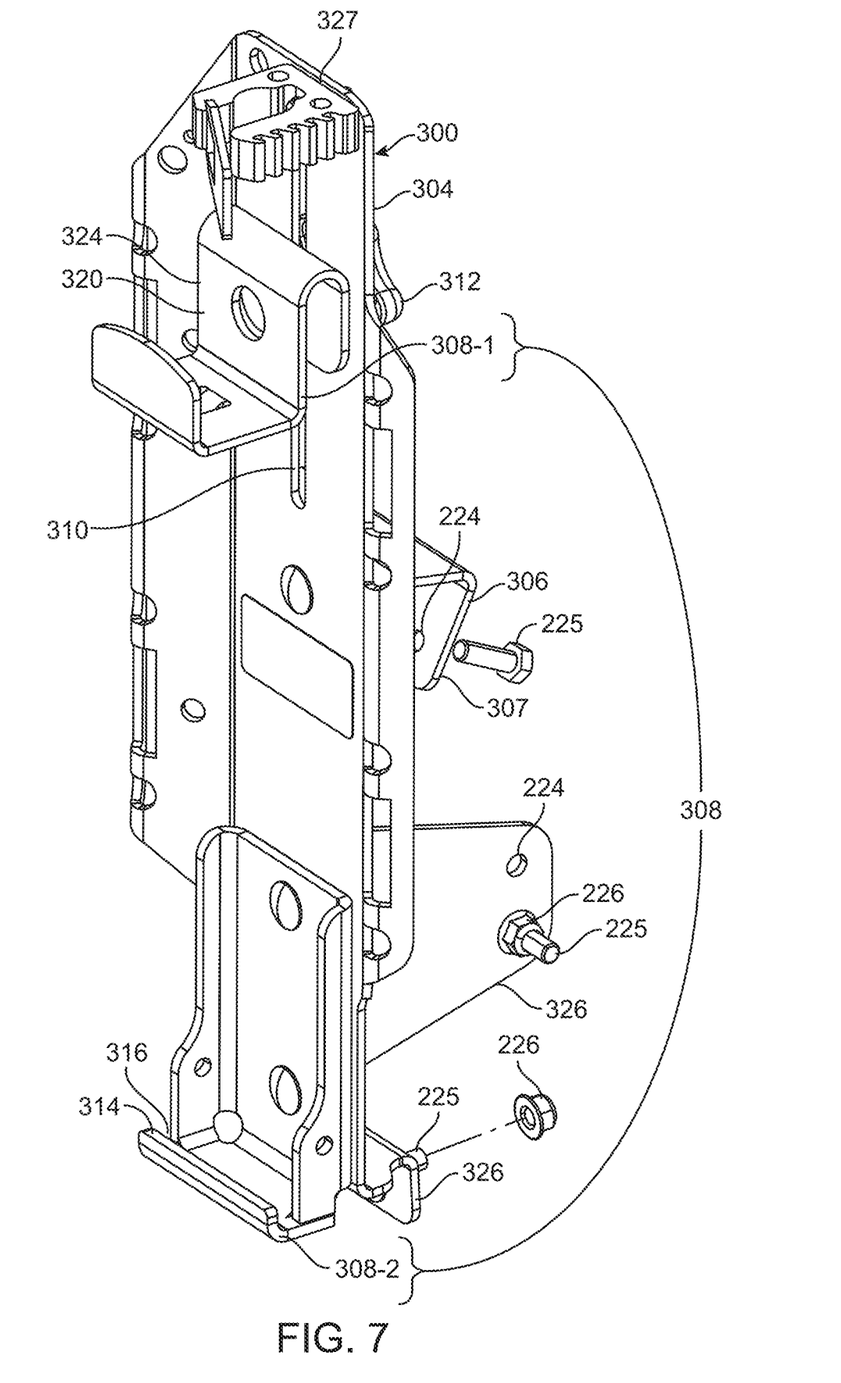
FIG. 7 is an enlarged, isolated view of the bucket connector of FIG. 6.

As with the connector 220, the connector 300 may include a frame 304 defining or supporting both a mounting portion 306 and a tool or bucket holding portion 308. The mounting portion may include a tab or flange 307 defining one or more holes 224 that align with corresponding apertures 201 (see FIG. 6) on the tool panel assembly 202 (e.g., panel 204a-1). One or more fasteners (e.g., bolts 225) may then be passed (from behind the tool panel 204a-1) through aligned holes 224/apertures 201 and each threadably engaged with a nut 226 to secure the tool connector in place. While two bolts 225/nuts 226 are shown in FIGS. 6-7, configurations using one or even three or more holes 224/apertures 201 and corresponding bolts/nuts could be utilized without departing from the scope of this disclosure. To permit simplified mounting of the various tool connectors, the panels 204 may be configured to permit hand and/or tool access to the fastener/nut located on the back side of the panels.

The exemplary tool (bucket) holding portion 308 of the bucket connector 300 may include both a first or upper tool holding portion 308-1 and a second or lower tool holding portion 308-2 as shown in FIG. 7. The lower tool holding portion 308-2 may be generally fixed relative to the frame 304 of the connector 300, while the upper too holding portion 308-1 may be adjustable. For example, the portion 308-1 may be adjustable in a vertical direction relative to the connector frame 304 by sliding along a slot 310. Once the portion 308-1 is at the desired height, it may be secured in place with a fastener, e.g., threaded knob 312. Of course, embodiments wherein the portion 308-2 is adjustable, and/or the portion 308-1 is fixed, are also contemplated.

The lower tool holding portion 308-2 may form a flange or hook 314 defining a gap 316 between the hook and the frame 304. The gap 316 may receive a lip 318 formed on a bottom edge of the bucket 302 as shown in the cross section of FIG. 8. The upper tool holding portion 308-1 may also include a hook 320 in the form of an inverted "J."

Figure 8:
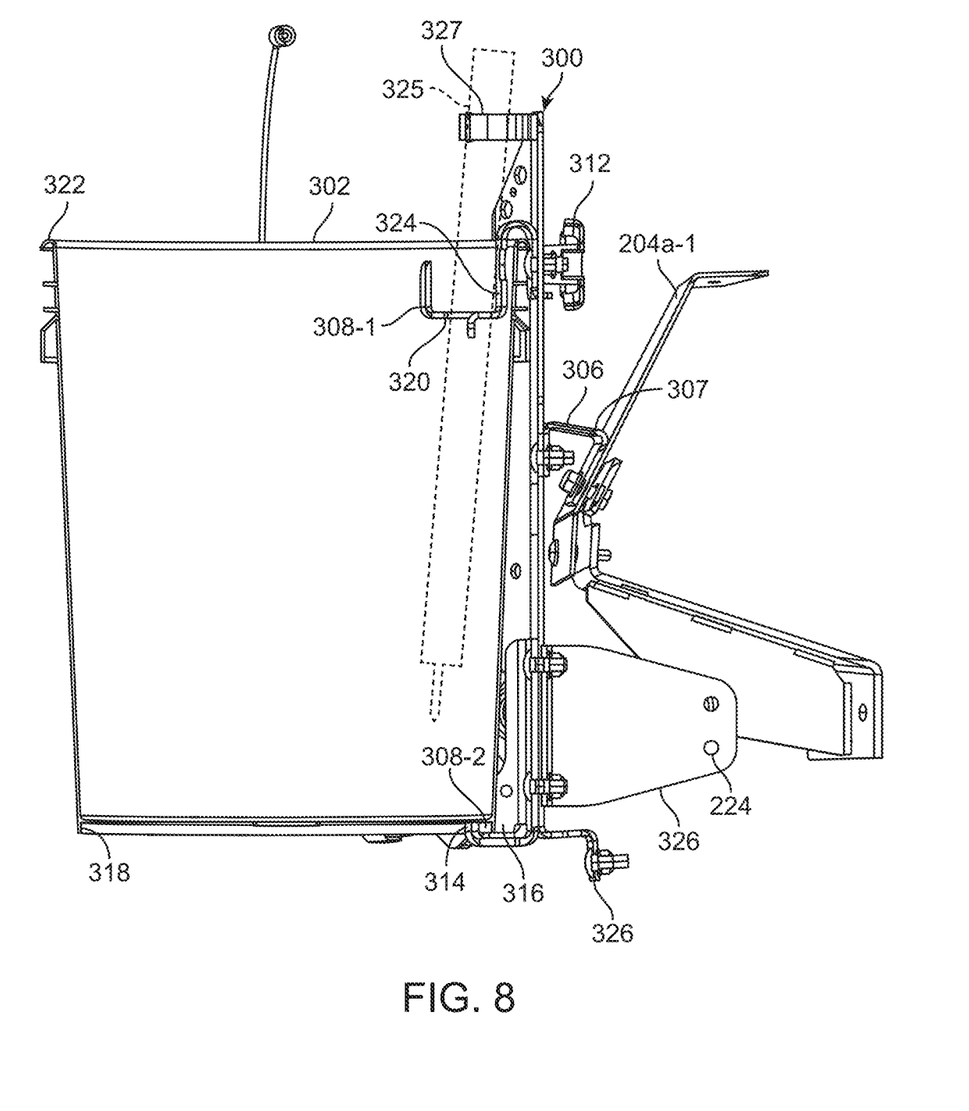
FIG. 8 is a cross section of a bucket secured with the bucket connector of FIG. 6.

In use, the operator may insert the lip 318 of the bucket 302 into the gap 316 formed by the hook 314 of the lower tool holding portion 308-2. The upper end of the bucket 302 may then be pivoted toward the hook 320 until an upper lip 322 of the bucket is flush to the frame 304. The hook 320 may then be slid downwardly until a leg 324 of the hook 320 is situated within the bucket as shown in FIG. 8. At this point, the knob 312 may be tightened to secure the bucket 302 in place.

In some embodiments, a supplemental mounting portion 326 may also be provided. In the illustrated embodiment, the tool mounting portion 326 may be one or more (e.g., two) flanges extending from the frame 304 as is best visible in FIGS. 7 and 8. The flange may include one or more holes 224 that align with apertures (not shown) on the chassis 102 of the vehicle 100 and secured relative thereto with bolts 225/nuts 226. Such a supplemental mounting portion 326 may provide the bucket connector 300 with more rigidity than available merely by attachment to the tool mounting panels 204. However, those of skill in the art will realize that bucket connector embodiments lacking supplemental mounting portions are certainly possible without departing from the scope of this disclosure. That is to say, bucket connectors that attach solely to the panels 204 are contemplated within this disclosure.

In addition to the supplemental mounting portion 326, the bucket connector 300 may further include an additional tool holding portion. For example, the connector 300 may also include a tool holding portion 327 that is similar in many ways to the tool holding portion 223 of the connector 220 already described herein (as a result of these similarities, further description of the tool holding portion 327 is not provided herein). The tool holding portion 327 may be oriented vertically (rather than generally horizontally as with the connector 220) and may assist with holding an elongate tool 325 (garbage pick or the like; see FIG. 8) within the bucket 302 during mower operation. Thus, the connector 300 may be used to support, independently or in combination, two separate tools (e.g., the bucket 302 and/or the elongate tool 325).

As one can appreciate, tool mounting panels 204 like those illustrated herein may provide tool attachment points yielding advantageous positioning of certain tools. For example, with respect to the bucket 302, the panel 204a-1 (or 204b-1) permits a bucket location that is low and longitudinally proximate the mower's center of gravity (e.g., forward of the rear wheels (specifically, at a longitudinal location between the front and rear wheels). As a result, as the bucket is filled, it's weight has little impact on overall mower weight distribution. In addition, by locating the bucket (or other tool) lateral to the mower operator (e.g., to the operator seat 112), it remains easily accessible by the operator from the operator seat 112. Similarly, its low position relative to the operator reduces potential interference with operator sight lines. Yet further, the exemplary bucket location may be mostly (and, in some embodiments, entirely) contained within an envelope (when viewed from above) defined by the cutting deck 114 (note that space constraints and the taper of the bucket may result in portions of the bucket protruding laterally and/or rearwardly beyond the deck edges). Such exemplary bucket positioning may thus reduce the chances of the bucket interfering with mower operation (e.g., trimming, zero radius turning, etc.).

While illustrated herein with some degree of specificity, the bucket connector 300 is exemplary only. For instance, alternative embodiments could utilize a rigid or flexible hoop as the tool holding portion 308-1, while optionally providing a lower tool holding portion or shelf 308-2 to support the bottom of the bucket.

Still yet another exemplary tool connector 400 is shown in FIGS. 1, 2, 9, and 10. Unlike the tool connectors 220 and 300, the tool connector 400 is intended to accommodate a nonspecific or generic tool that, for purposes of this description, is a debris blower 402 (diagrammatically illustrated in FIG. 9). However, other tools (e.g., such as liquid sprayers and granular spreaders) may also be carried by the connector 400.

Figure 9:
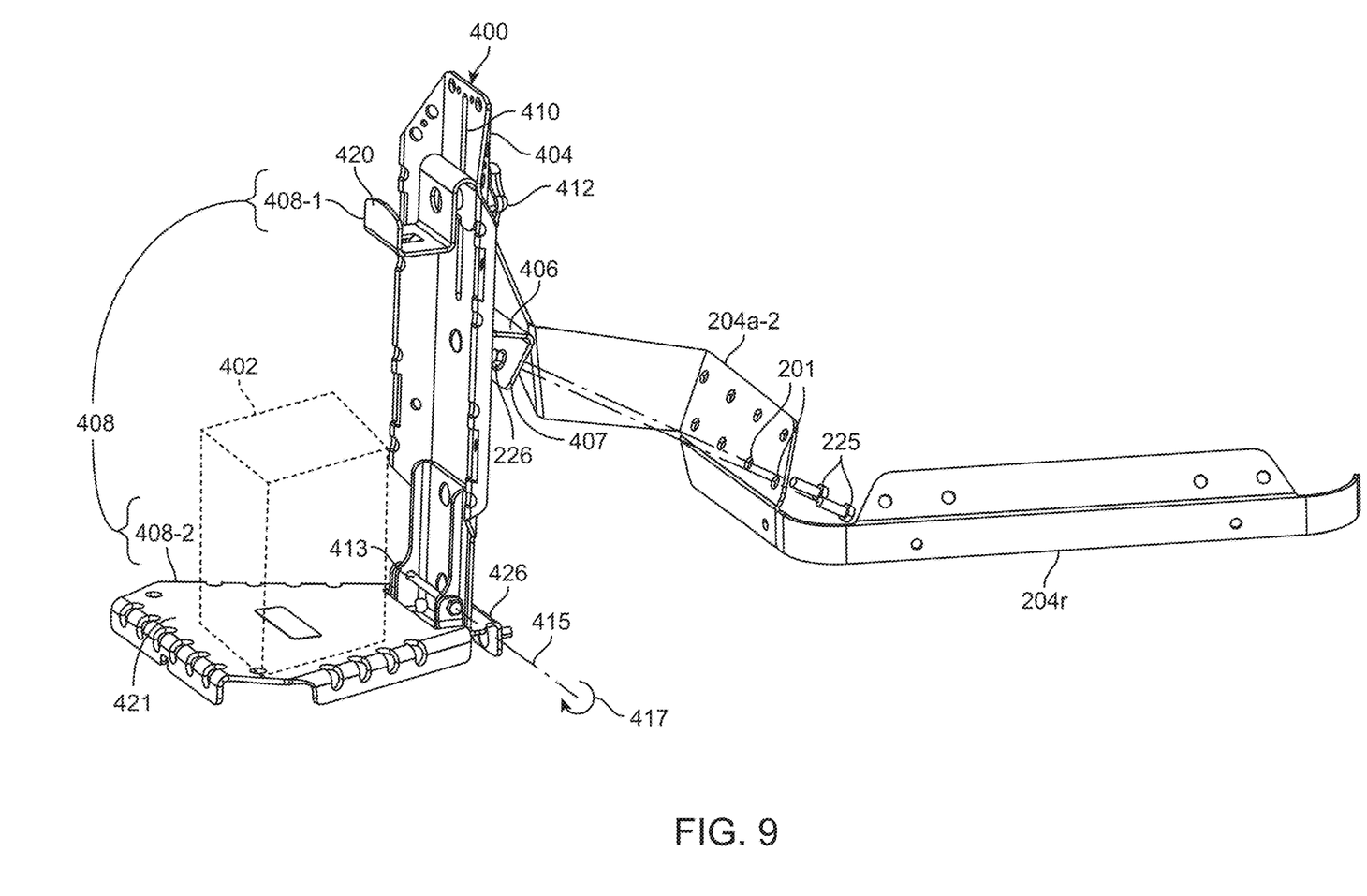
FIG. 9 is a perspective view of an exemplary third tool connector exploded from the tool panel assembly, the third tool connector adapted to hold a third tool, e.g., debris blower.
Figure 10:
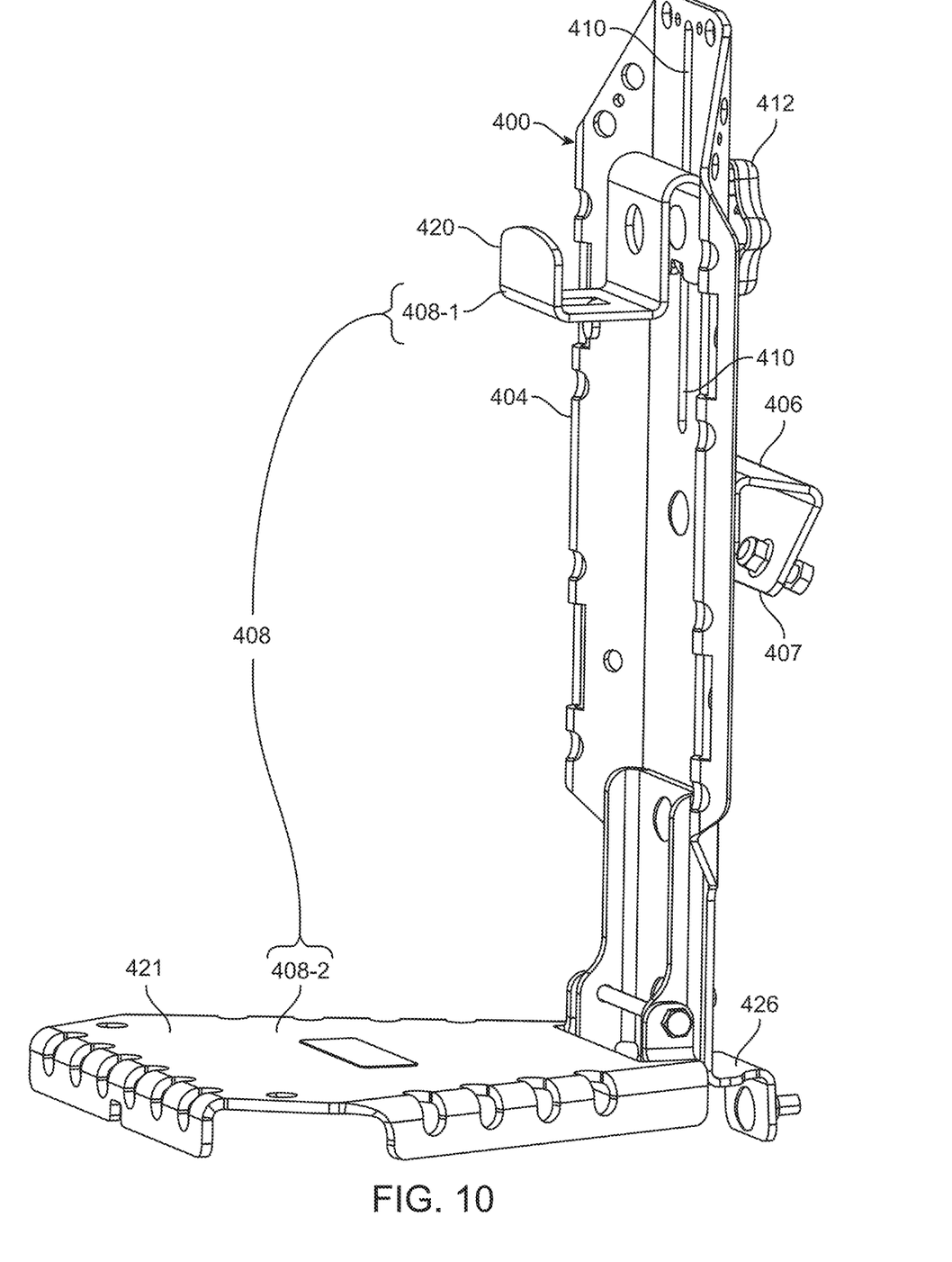
FIG. 10 is an enlarged, isolated view of the exemplary third tool connector of FIG. 9.

As with the connector 300, the connector 400 may include a frame 404 defining both a mounting portion 406 and a tool holding portion 408. The mounting portion may include a tab or flange 407 defining one or more holes (not shown) that align with corresponding apertures 201 on the tool panel assembly 202 (e.g., on the panel 204a-2). One or more fasteners (e.g., bolts 225) may then be passed through aligned holes/apertures 201 and each threadably engaged with a nut 226 to secure the tool connector 400 in place. While two bolts 225/nuts 226 are shown in FIG. 9, configurations using one, or even three or more, bolts/nuts may also be provided.

The exemplary tool holding portion 408 of the connector 400 may include both a first or upper tool holding portion 408-1 and a second or lower tool holding portion 408-2. As with the connector 300, one or both of the upper and lower tool holding portions 408 may be adjustable relative to the frame 404. In the illustrated embodiment, the portion 408-1 is substantially similar to the tool holding portion 308-1 already described herein above, i.e., it includes a hook 420 slidably adjustable within a slot 410 and secured in place with a threaded knob 412. As a result, further description of the portion 408-1 is not provided herein.

The lower tool holding portion 408-2 may form a shelf or plate 421 adapted to support a tool (e.g., debris blower) thereon. In some embodiments, the shelf 421 may be hingedly connected to the frame 404 (e.g., about pivot pin 413) to permit the shelf to be pivoted about an axis 415 of the pin in the direction 417. This allows the shelf 421 to be folded flat against the frame 404 when the connector 400 is not actively supporting a tool.

In use, the operator may place the shelf 421 in its horizontal orientation as shown in the figures, and then set the tool 402 upon the shelf. The knob 412 may then be loosened and the hook 420 slid up or down to engage a portion of the tool (e.g., a handle). Once the knob 412 is then tightened, the tool 402 may be held securely in place upon the shelf. In some embodiments, a strap may be used in conjunction with the knob 412/hook 420 to secure the tool.

In some embodiments, a supplemental mounting portion 426 may also be provided. In the illustrated embodiment, the supplemental mounting portion 426 may be a flange extending from the frame 404. The flange may include one or more holes that align with apertures (not shown) on the chassis 102 of the vehicle 100. Such a supplemental mounting portion 426 may provide the connector 400 with increased rigidity as compared to attachment solely to the tool mounting panel 204a-2. However, those of skill in the art will realize that connector embodiments lacking the supplemental mounting portion are certainly possible without departing from the scope of this disclosure.

While not illustrated, the connector 400 could, like the connector 300, include an additional tool holding portion such as the tool holding portion 327 already described herein with reference to the connector 300.

As those of skill in the art will appreciate, attachment systems in accordance with embodiments of the present disclosure allow secure attachment of various tools to the turf vehicle in various configurations that are best suited to the particular operator and/or work function. For example, while shown with the string trimmer attached to the right side, the trimmer could easily be attached to the left side if desired. Moreover, while shown with a single connector 300 and 400, other embodiments may include two connectors 300 (or two connectors 400) without departing from the scope of this disclosure. Still further, while the tool connectors are illustrated as being attached to specific locations on the tool panel assembly, such a configuration is exemplary only. For instance, the bucket connector 300 could be placed on the right side of the vehicle, or could be located near the rear of the vehicle like the connector 400. Alternatively, a connector could be attached to the rear panel 204r if desired. Still further, in other embodiments, tool mounting panels may be provided on other portions of the vehicle (e.g., the front side).

Other tool connectors are also contemplated. For example, a horizontal shelf (not shown) may be connected, e.g., via legs, directly to the chassis or to the panels 204a-2 and 204b-2. The shelf may support any number of tools including a tool box or a leaf blower. For instance, a backpack-style leaf blower may be attached to the shelf while its blower tube extends down along the side of the mower where it may be supported by a connector on one of the tool panels 204a-1 or 204a-2. This would allow the operator to operate the leaf blower without exiting the operator seat.

Still further, while shown as using apertures 201 and bolts/nuts to secure the connectors to the tool panel assembly, other mounting configurations are certainly possible. For instance, tool-less fasteners (e.g., 90-degree "turn-to-lock" cam elements) could replace the nut/bolt configurations described herein. In yet other embodiments, the mounting portion of some of the connectors could be configured as one or more magnets that magnetically couple to the panel assembly. Still further, the mounting portions could form tabs that slide within notched slots (instead of apertures) in the panel assembly. This would allow adjustable positioning of the connector and positive locking once the tab engages one of the notches (notches provided at various locations along the slots).

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A turf vehicle comprising:
   a chassis comprising front and rear sides and left and right sides;
   a tool mounting panel located on each of the right side, left side, and rear side of the chassis, wherein each tool mounting panel defines a plurality of receivers; and
   first and second tool connectors that each comprise:
      a mounting portion adapted to be removably secured to the panels at two or more alternative locations via one or more of the plurality of receivers; and
      a tool holding portion adapted to receive and hold an outdoor maintenance tool,
      wherein the tool holding portion of the first tool connector is adapted to receive and support a first outdoor maintenance tool, and the tool holding portion of the second tool connector is adapted to receive and hold a second outdoor maintenance tool different than the first outdoor maintenance tool.

2. The vehicle of claim 1, wherein the first and second outdoor maintenance tools are simultaneously supported on the panels by the respective first and second tool connectors.

3. The vehicle of claim 1, wherein the mounting portion of each of the first and second tool connectors is configured to be secured to any one of multiple locations on one of the mounting panels.

4. The vehicle of claim 1, wherein the plurality of receivers is defined by two or more apertures.

5. The vehicle of claim 4, wherein the apertures formed in at least one of the mounting panels include two rows of apertures, wherein at least one row includes two or more apertures.

6. The vehicle of claim 1, wherein each of the first and second outdoor maintenance tools is selected from the group consisting of a receptacle, a string trimmer, a debris blower, a shovel, a debris grabbing device, and a rake.

7. The vehicle of claim 6, wherein the receptacle comprises a bucket.

8. The vehicle of claim 1, further comprising a supplemental tool connector attached to the chassis at a location spaced-apart from the mounting panels.

9. The vehicle of claim 1, wherein the turf vehicle comprises a riding lawn mower.

10. The vehicle of claim 1, wherein the first tool connector is connectable to the panel located on either of the two sides.

11. A riding turf vehicle comprising:
    a chassis comprising front and rear sides and left and right sides;
    wheels rotatably coupled to the chassis and adapted to support the chassis relative to a ground surface;
    a prime mover attached to the chassis and adapted to provide driving power to one or more of the wheels and to a ground working tool supported by the chassis;
    a tool mounting panel located on each of two sides of the chassis, wherein each tool mounting panel defines a plurality of receivers; and
    removable first and second tool connectors that each comprise:
       a mounting portion adapted to be secured relative to any one of the panels via coupling with one or more of the plurality of receivers, wherein the mounting portion is adapted to be secured to any one of multiple locations on the any one of the panels; and
       a tool holding portion adapted to receive and carry an outdoor maintenance tool,
       wherein the tool holding portion of the first tool connector is adapted to receive and carry a first outdoor maintenance tool, and the tool holding portion of the second tool connector is adapted to simultaneously receive and hold a second outdoor maintenance tool different than the first outdoor maintenance tool.

12. The vehicle of claim 11, wherein the plurality of receivers of each panel is defined by two or more apertures.

13. The vehicle of claim 11, wherein the tool mounting panels are located on the left and right sides of the chassis.

14. The vehicle of claim 11, wherein the tool holding portion of one or both of the first and second tool connectors is movable between a release configuration, wherein the outdoor maintenance tool is configured to be attached to or removed from the tool connector; and a hold configuration, wherein the outdoor maintenance tool is immobilized relative to the tool connector.

15. The vehicle of claim 11, wherein the tool holding portion of the first tool connector is adjustable to receive two or more different outdoor maintenance tools.

16. The vehicle of claim 11, wherein the ground working tool comprises a lawn mower deck.

17. A method for supporting an outdoor maintenance tool relative to a chassis of a turf vehicle, the method comprising:
    attaching a first tool connector to a tool panel assembly located on the chassis, the first tool connector comprising: a mounting portion adapted to secure to any one of a plurality of predefined locations on the panel assembly; and a tool holding portion adapted to receive and hold a first tool;
    attaching a second tool connector to the panel assembly, the second tool connector comprising: a mounting portion adapted to secure to one of the plurality of predefined locations on the panel assembly; and a tool holding portion adapted to receive and hold a second tool that is different than the first tool;
    attaching the first tool to the tool holding portion of the first tool connector; and
    attaching the second tool to the tool holding portion of the second tool connector while the first tool is held by the first tool connector.

18. A turf vehicle comprising:
    a chassis comprising front and rear sides and left and right sides;

a rear wheel and a front wheel supporting the chassis upon a ground surface;
a tool mounting panel located on at least one of the left and right sides of the chassis and at a location forward of the rear wheel, wherein the tool mounting panel defines a plurality of receivers; and
a bucket connector comprising:
   a mounting portion adapted to be removably secured to the panel; and
   a bucket holding portion adapted to receive and hold a bucket at a longitudinal location between the front and rear wheel.

19. A turf vehicle comprising:
a chassis comprising front and rear sides and left and right sides;
a lawn deck mounted to the chassis;
a rear wheel and a front wheel supporting the chassis upon a ground surface;
an operator platform supported by the chassis;
a tool mounting panel located on at least one of the left and right sides of the chassis, wherein the tool mounting panel defines a plurality of receivers; and
a bucket connector comprising:
   a mounting portion adapted to be removably secured to the panel; and
   a bucket holding portion adapted to receive and hold a bucket at a location lateral to the operator platform such that the bucket is contained within an envelope defined by the lawn deck when viewed from above.

* * * * *